(12) United States Patent  
Birau et al.

(10) Patent No.: US 9,334,335 B2
(45) Date of Patent: May 10, 2016

(54) SURFACE LAYER

(71) Applicant: Xerox Corporation, Norwalk, CT (US)

(72) Inventors: Mihaela M. Birau, Mississauga (CA); Salma F. Toosi, Mississauga (CA); Biby E. Abraham, Mississauga (CA); Christopher A. Wagner, Toronto (CA); C. Geoffrey Allen, Waterdown (CA); Peter G. Odell, Mississauga (CA); Daryl W. Vanbesien, Mississauga (CA); Carolyn P. Moorlag, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 686 days.

(21) Appl. No.: 13/690,415

(22) Filed: Nov. 30, 2012

(65) Prior Publication Data

US 2014/0154502 A1   Jun. 5, 2014

(51) Int. Cl.
  *C09D 101/02*   (2006.01)
  *C08B 15/06*    (2006.01)
  *C09D 101/08*   (2006.01)

(52) U.S. Cl.
  CPC .............. *C08B 15/06* (2013.01); *C09D 101/08* (2013.01); *Y10T 428/263* (2015.01); *Y10T 428/3154* (2015.04)

(58) Field of Classification Search
  None
  See application file for complete search history.

(56) References Cited

U.S. PATENT DOCUMENTS 4,298,672 A   11/1981   Lu
4,617,385 A * 10/1986   Namikoshi et al. ............. 536/98
5,145,518 A    9/1992   Winnik et al.
5,146,087 A    9/1992   VanDusen
5,202,265 A    4/1993   LaMora
5,208,630 A    5/1993   Goodbrand et al.
5,225,900 A    7/1993   Wright
5,231,135 A    7/1993   Machell et al.
5,256,193 A   10/1993   Winnik et al.
5,271,764 A   12/1993   Winnik et al.

(Continued)

OTHER PUBLICATIONS

Bao et al, Effects of DS and different modified MMT on properties of superabsorbent nanocomposites, American Chemical Society, 2011.

*Primary Examiner* — Callie Shosho
*Assistant Examiner* — Patrick English
(74) *Attorney, Agent, or Firm* — Hoffman Warnick LLC

(57) ABSTRACT

There is described a surface layer or coating of a fluoropolymer. Dispersed in the fluoropolymer is a compound of the formula:

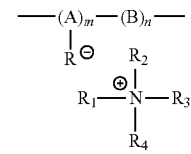

wherein $R_1$, $R_2$, $R_3$, and $R_4$ each, independently of the others, are —H, alkyl, aryl, arylalkyl, or alkylaryl, R is a group of the formula —COOH, —COOM, —$R_5$—COOH, —$R_5$—COOM, —X—$R_5$—COOH, or —X—$R_5$—COOM wherein X and $R_5$ are as defined herein, M is a cationic metal, A represents a saccharide monomer repeating unit having one or more R groups, B represents a saccharide monomer repeating unit having no R groups, m is an integer representing the number of repeating A units, and n is an integer representing the number of repeating B units.

17 Claims, 5 Drawing Sheets

(56) References Cited

U.S. PATENT DOCUMENTS

| | | |
|---|---|---|
| 5,275,647 A | 1/1994 | Winnik |
| 2,586,286 A | 2/1994 | Winnik et al. |
| 5,301,044 A | 4/1994 | Wright |
| 5,378,574 A | 1/1995 | Winnik et al. |
| 5,385,803 A | 1/1995 | Duff et al. |
| 5,543,177 A | 8/1996 | Morrison et al. |
| 5,554,480 A | 9/1996 | Patel et al. |
| 5,621,022 A | 4/1997 | Jaeger et al. |
| 6,221,137 B1 | 4/2001 | King et al. |
| 6,281,172 B1 | 8/2001 | Warren et al. |
| 6,419,615 B1 * | 7/2002 | Chen et al. ............... 492/56 |
| 6,860,930 B2 | 3/2005 | Wu et al. |
| 6,893,479 B2 | 5/2005 | Eswaran et al. |
| 2004/0018310 A1 * | 1/2004 | Badesha et al. ............ 427/385.5 |

* cited by examiner

SURFACE LAYER

CROSS REFERENCE TO RELATED APPLICATIONS

This application relates to commonly assigned copending application Ser. No. 13/690,475, now U.S. Pat. No. 8,647,422 entitled "Phase Change Ink Comprising A Modified Polysaccharide Composition"; and to commonly assigned copending application Ser. No. 13/690,433, entitled "Modified Polysaccharide Composition"; filed simultaneously herewith and incorporated by reference herein in their entirety.

BACKGROUND

1. Field of Use

This disclosure is generally directed to surface layers having a low surface energy and specifically to fuser members useful in electrophotographic imaging apparatuses, including digital, image on image, and the like.

2. Background

Low surface-energy coatings are required in many industries for a broad range of applications, including non-stick cookery, anti-fouling of marine contaminants, self-cleaning windows and architectural materials, machinery coatings, mold release packaging, ink and toner packaging, anti-graffiti components, inkjet printing and oil-less printing. Low surface-energy coatings are required for oil-less printing. Fillers have been added to low surface energy fluoropolymer materials such as PFA to modify the surface properties; however non-fluorinated material fillers often result in poor release performance. It would be desirable to have a filler material that improves surface properties of fuser topcoats.

Linear polysaccharides (cellulose) and their derivatives are a known material used in various applications such as water paints, paper products and detergents. Sodium carboxymethyl cellulose, a polysaccharide derivative, is an anionic water soluble polymer derived from cellulose. Sodium carboxymethyl cellulose has desirable properties; it is easily suspended in dispersions and forms film easily. Sodium carboxymethyl cellulose is also resistant to oils and solvents and improves the hardness of composites. However, sodium carboxymethyl cellulose is a polar material, which limits its applicability.

While known linear polysaccharides and their derivatives are suitable for certain purposes, it would be desirable to expand their use to other applications.

SUMMARY

Disclosed herein is a surface layer including a fluoropolymer and a modified cellulose. The modified cellulose is represent by the formula:

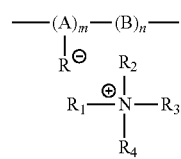

wherein: $R_1$, $R_2$, $R_3$, and $R_4$ each, independently of the others, are: (A) —H; (B) alkyl, including substituted and unsubstituted alkyl, wherein hetero atoms either may or may not be present in alkyl; (C) aryl, including substituted and unsubstituted aryl, wherein hetero atoms either may or may not be present in aryl; (D) arylalkyl, including substituted and unsubstituted arylalkyl, wherein hetero atoms either may or may not be present in either or both of the alkyl portion and the aryl portion of arylalkyl; or (E) alkylaryl, including substituted and unsubstituted alkylaryl, wherein hetero atoms either may or may not be present in either or both of the alkyl portion and the aryl portion of alkylaryl; R is a group of the formula —COOH, —COOM, —$R_5$—COOH, —$R_5$—COOM, —X—$R_5$—COOH, or —X—$R_5$—COOM, wherein: $R_5$ is a first moiety selected from the group consisting of alkylene, arylene, arylalkylene, and alkylarylene, including substituted and unsubstituted first moieties, wherein hetero atoms either may or may not be present in the first moiety; M is a cationic metal; X is: (i) —O—; (ii) —S—; (iii) a group of the formula —$NR_6R_7$—; wherein $R_6$ and $R_7$ each, independently of the other are:

(a) —H; or
(b) a second moiety selected from the group consisting of alkyl, aryl, arylalkyl, and alkylaryl, including substituted and unsubstituted second moieties, wherein hetero atoms either may or may not be present in the second moiety; (iv) a group of the formula

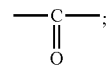

(v) a group of the formula

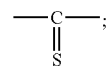

or
(vi) a group of the formula

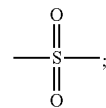

A represents a saccharide monomer repeating unit having one or more R groups; B represents a saccharide monomer repeating unit having no R groups; m is an integer representing the number of repeating A units; and n is an integer representing the number of repeating B units; wherein modified carboxy cellulose comprises from about 0.1 weight percent to about 25 weight percent of the coating.

Disclosed herein is a surface coating comprising a fluoropolymer having dispersed therein a compound of the formula:

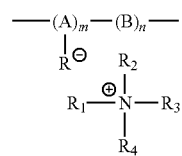

wherein $R_1$, $R_2$, $R_3$, and $R_4$ each, independently of the others, are —H, alkyl, aryl, arylalkyl, or alkylaryl, R is a group of the formula —COOH, —COOM, —$R_5$—COOH, —$R_5$—COOM, —X—$R_5$—COOH, or —X—$R_5$—COOM wherein $R_5$ is a first substituent selected from the group consisting of alkylene, arylene, arylalkene, alkyl aryl, X is:
(i) —O—;
(ii) —S—;
(iii) a group of the formula —$NR_6R_7$—; wherein $R_6$ and $R_7$ each, independently of the other are —H; a second substitutent selected from the group consisting of alkyl, aryl, arylalkyl, alkylaryl, including substituted and unsubstituted second substituent, wherein hetero atoms either may or may not be present in second susbstituent;
(iv) a group of the formula

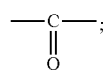

(v) a group of the formula

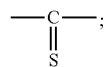

or
(vi) a group of the formula

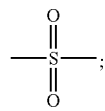

M is a cationic metal, A represents a saccharide monomer repeating unit having one or more R groups, B represents a saccharide monomer repeating unit having no R groups, m is an integer representing the number of repeating A units, and n is an integer representing the number of repeating B units Disclosed herein is a fuser member including a substrate, a functional layer disposed on the substrate and an outer layer disposed on the functional layer. The outer layer comprises a fluoropolymer having dispersed therein a compound of the formula:

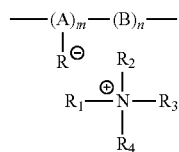

wherein $R_1$, $R_2$, $R_3$, and $R_4$ each, independently of the others, are —H, alkyl, aryl, arylalkyl, or alkylaryl, R is a group of the formula —COOH, —COOM, —$R_5$—COOH, —$R_5$—COOM, X—$R_5$—COOH, or —X—$R_5$—COOM wherein $R_5$ is a first substituent selected from the group consisting of alkylene, arylene, arylalkene, alkyl aryl, X is:
(i) —O—;
(ii) —S—;
(iii) a group of the formula —$NR_6R_7$—; wherein $R_6$ and $R_7$ each, independently of the other are —H; a second substitutent selected from the group consisting of alkyl, aryl, arylalkyl, alkylaryl, including substituted and unsubstituted second substituent, wherein hetero atoms either may or may not be present in second susbstituent;
(iv) a group of the formula

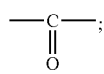

(v) a group of the formula

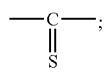

or
(vi) a group of the formula

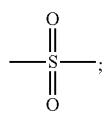

M is a cationic metal, A represents a saccharide monomer repeating unit having one or more R groups, B represents a saccharide monomer repeating unit having no R groups, m is an integer representing the number of repeating A units, and n is an integer representing the number of repeating B units, wherein modified carboxy cellulose comprises from about 0.1 weight percent to about 25 weight percent of the outer layer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
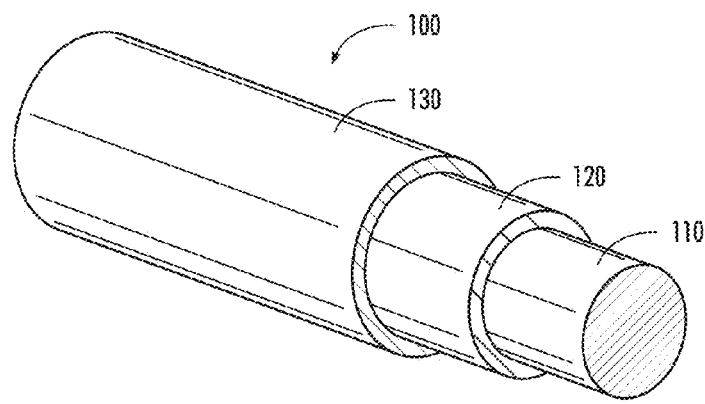
FIG. 1 depicts an exemplary fusing member having a cylindrical substrate in accordance with the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Disclosed herein is a surface layer dispersed therein a modified carboxy cellulose. The coatings are required in many industries for a broad range of applications, including non-stick cookery, anti-fouling of marine contaminants, self-cleaning windows and architectural materials, machinery coatings, mold release packaging, ink and toner packaging, anti-graffiti components, ink jet printing and oil-less printing. Fuser topcoats with very low surface energy are required for oil-less fusing. Fillers may be added to low surface energy materials such as PFA to modify the material's properties, but addition of non-fluorinated materials often results in poor release performance. A composite coating that improves surface properties is desirable for fusing and other applications is described herein.

A method to modify cellulose or linear polysaccharides and their derivatives such as carboxy methyl cellulose is provided. The linear cellulose is modified by reacting the cellulose with quaternary ammonium salts having long chain carbon groups in water at elevated temperatures (e.g. about from 50° C. to about 100° C.). The modified carboxy cellulose is water-insoluble and compatible with non-polar media.

Long alkyl chain quaternary ammonium salts are used as the modifying agents for modifying the cellulose. Sodium carboxymethyl cellulose is modified to form a hydrophobic cellulose, and has been formulated and used as a filler in non-stick coatings.

The fixing or fuser member using the surface coating described herein can include a substrate having one or more functional layers formed thereon. The one or more functional layers includes the surface coating or top layer having a surface wettability that is hydrophobic and/or oleophobic. Such a fixing member can be used as in a fusing member for high speed, high quality electrophotographic printing to ensure and maintain a good toner release from the fused toner image on the supporting material (e.g., a paper sheet), and further assist paper stripping.

In various embodiments, the fixing member can include, for example, a substrate, with one or more functional layers formed thereon. The substrate can be formed in various shapes, e.g., a cylinder (e.g., a cylinder tube), a cylindrical drum, a belt, or a film, using suitable materials that are non-conductive or conductive depending on a specific configuration, for example, as shown in FIGS. 1 and 2.

Figure 2:
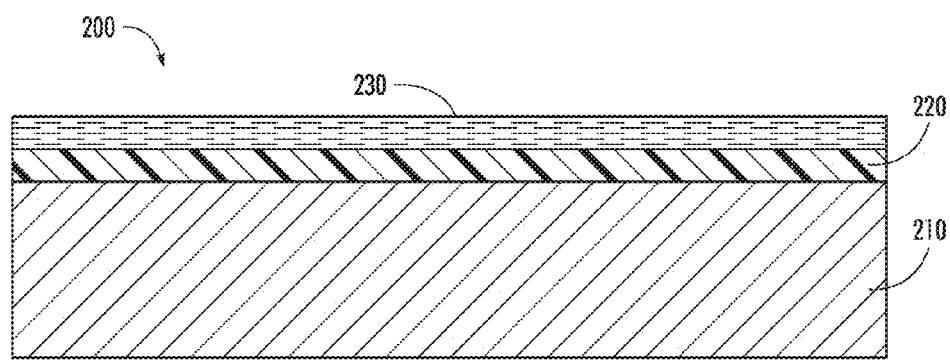
FIG. 2 depicts an exemplary fusing member having a belt substrate in accordance with the present teachings.

Specifically, FIG. 1 depicts an exemplary fixing or fusing member 100 having a cylindrical substrate 110 and FIG. 2 depicts another exemplary fixing or fusing member 200 having a belt substrate 210 in accordance with the present teachings. It should be readily apparent to one of ordinary skill in the art that the fixing or fusing member 100 depicted in FIG. 1 and the fixing or fusing member 200 depicted in FIG. 2 represent generalized schematic illustrations and that other layers/substrates can be added or existing layers/substrates can be removed or modified.

In FIG. 1 the exemplary fixing member 100 can be a fuser roller having a cylindrical substrate 110 with one or more functional layers 120 (also referred to as intermediate layers) and an outer layer 130 formed thereon. In various embodiments, the cylindrical substrate 110 can take the form of a cylindrical tube, e.g., having a hollow structure including a heating lamp therein, or a solid cylindrical shaft. In FIG. 2, the exemplary fixing member 200 can include a belt substrate 210 with one or more functional layers, e.g., 220 and an outer surface 230 formed thereon. The belt substrate 210 and the cylindrical substrate 110 can be formed from, for example, polymeric materials (e.g., polyimide, polyaramide, polyether ether ketone, polyetherimide, polyphthalamide, polyamide-imide, polyketone, polyphenylene sulfide, fluoropolyimides or fluoropolyurethanes) and metal materials (e.g., aluminum or stainless steel) to maintain rigidity and structural integrity as known to one of ordinary skill in the art.

Examples of functional layers 120 and 220 include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Examples of functional layers 120 and 220 also include fluoroelastomers. Fluoroelastomers are from the class of 1)

copolymers of two of vinylidenefluoride, hexafluoropropylene, and tetrafluoroethylene; such as those known commercially as VITON A®, 2) terpolymers of vinylidenefluoride, hexafluoropropylene, and tetrafluoroethylene such as those known commercially as VITON B®; and 3) tetrapolymers of vinylidenefluoride, hexafluoropropylene, tetrafluoroethylene, and a cure site monomer, such as those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF® NM® FOR-THF®, FOR-TFS® TH® NH®, P757® TNS®, T439®, PL958® BR9151® and TN505®, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

For a roller configuration, the thickness of the functional layer can be from about 0.5 mm to about 10 mm, or from about 1 mm to about 8 mm, or from about 2 mm to about 7 mm. For a belt configuration, the functional layer can be from about 25 microns up to about 2 mm, or from 40 microns to about 1.5 mm, or from 50 microns to about 1 mm.

An exemplary embodiment of a release layer 130 or 230 or surface coating includes fluoropolymers having modified carboxy cellulose dispersed therein. Examples of fluoropolymers include fluoroplastics including polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoroplastics provide chemical and thermal stability and have a low surface energy. The fluoroplastics have a melting temperature of from about 255° C. to about 360° C. or from about 280° C. to about 330° C. Examples of fluoropolymers include fluoroelastomers are from the class of 1) copolymers of two of vinylidenefluoride, hexafluoropropylene, and tetrafluoroethylene; such as those known commercially as VITON A®, 2) terpolymers of vinylidenefluoride, hexafluoropropylene, and tetrafluoroethylene such as those known commercially as VITON B®; and 3) tetrapolymers of vinylidenefluoride, hexafluoropropylene, tetrafluoroethylene, and a cure site monomer, such as those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1, 3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company.

For the fuser member 200, the thickness of the outer surface layer or release layer 230 can be from about 10 microns to about 100 microns, or from about 20 microns to about 80 microns, or from about 30 microns to about 50 microns.

Additives and additional conductive or non-conductive fillers may be present in the intermediate layer substrate layers 110 and 210, the intermediate layers 220 and 230 and the release layers 130 and 230. In various embodiments, other filler materials or additives including, for example, inorganic particles, can be used for the coating composition and the subsequently formed surface layer. Conductive fillers used herein may include carbon blacks such as carbon black, graphite, fullerene, acetylene black, fluorinated carbon black, and the like; carbon nanotubes; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly (p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixtures thereof can be used as conductive fillers. In various embodiments, other additives known to one of ordinary skill in the art can also be included to form the disclosed composite materials.

Optionally, any known and available suitable adhesive layer may be positioned between the outer layer or outer surface, the functional layer and the substrate. The adhesive layer can be coated on the substrate, or on the outer layer, to a thickness of from about 2 nanometers to about 10,000 nanometers, or from about 2 nanometers to about 1,000 nanometers, or from about 2 nanometers to about 5000 nanometers. The adhesive can be coated by any suitable known technique, including spray coating or wiping.

Figure 3A:
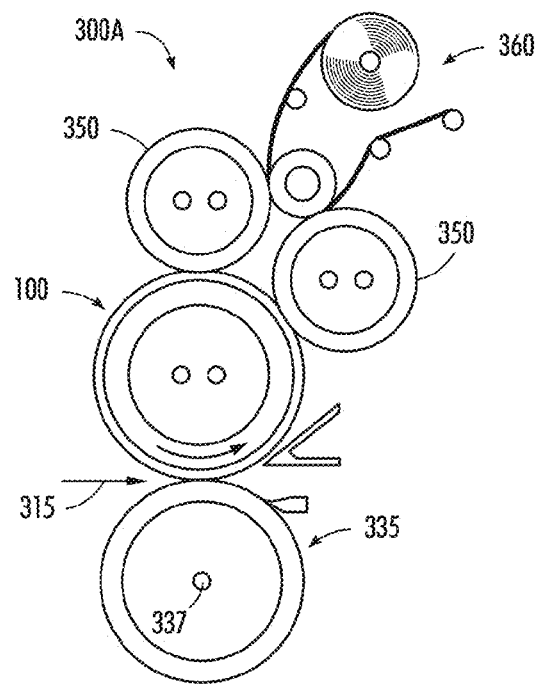
FIGS. 3A-3B depict exemplary fusing configurations using the fuser rollers shown in FIG. 1 in accordance with the present teachings.
Figure 3B:
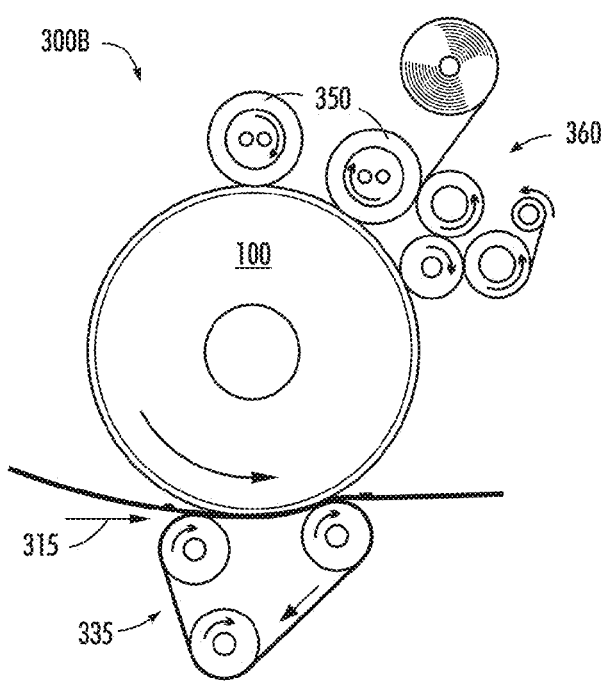
Figure 4A:
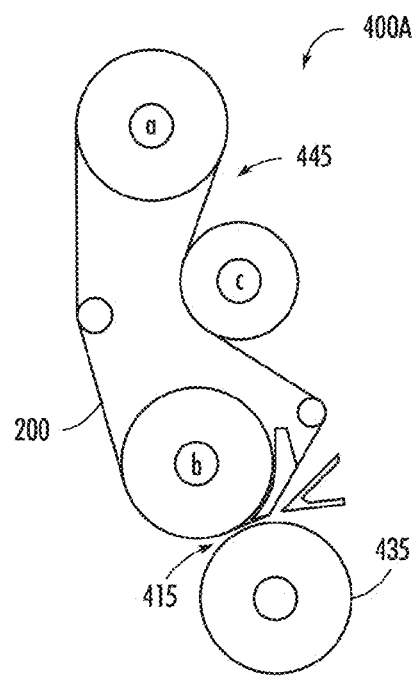
FIGS. 4A-4B depict exemplary fusing configurations using the fuser belt shown in FIG. 2 in accordance with the present teachings.
Figure 4B:
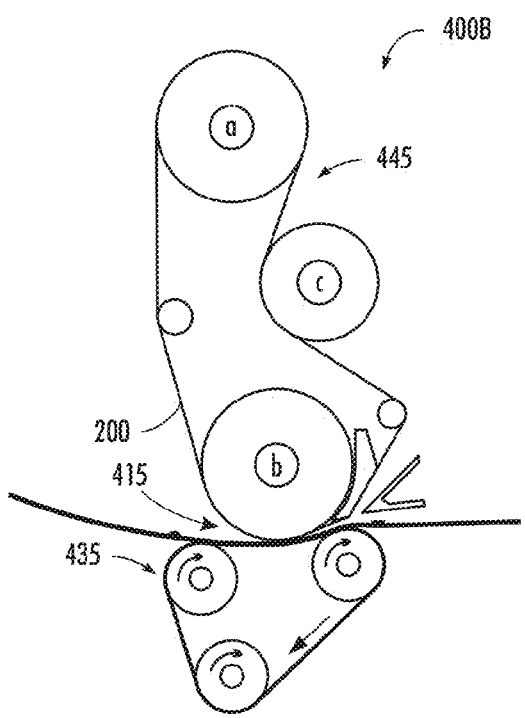

FIGS. 3A-4B and FIGS. 4A-4B depict exemplary fusing configurations for the fusing process in accordance with the present teachings. It should be readily apparent to one of ordinary skill in the art that the fusing configurations 300A-B depicted in FIGS. 3A-3B and the fusing configurations 400A-B depicted in FIGS. 4A-4B represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIGS. 3A-3B depict the fusing configurations 300A-B using a fuser roller shown in FIG. 1 in accordance with the present teachings. The configurations 300A-B can include a fuser roller 100 (i.e., 100 of FIG. 1) that forms a fuser nip with a pressure applying mechanism 335, such as a pressure roller in FIG. 3A or a pressure belt in FIG. 3B, for an image supporting material 315. In various embodiments, the pressure applying mechanism 335 can be used in combination with a heat lamp 337 to provide both the pressure and heat for the fusing process of the toner particles on the image supporting material 315. In addition, the configurations 300A-B can include one or more external heat roller 350 along with, e.g., a cleaning web 360, as shown in FIG. 3A and FIG. 3B.

FIGS. 4A-4B depict fusing configurations 400A-B using a fuser belt shown in FIG. 2 in accordance with the present teachings. The configurations 400A-B can include a fuser belt 200 (i.e., 200 of FIG. 2) that forms a fuser nip with a pressure applying mechanism 435, such as a pressure roller in FIG. 4A or a pressure belt in FIG. 4B, for a media substrate 415. In various embodiments, the pressure applying mechanism 435 can be used in a combination with a heat lamp to provide both the pressure and heat for the fusing process of the toner particles on the media substrate 415. In addition, the configurations 400A-B can include a mechanical system 445 to move the fuser belt 200 and thus fusing the toner particles and forming images on the media substrate 415. The mechanical system 445 can include one or more rollers 445a-c, which can also be used as heat rollers when needed.

Figure 5:
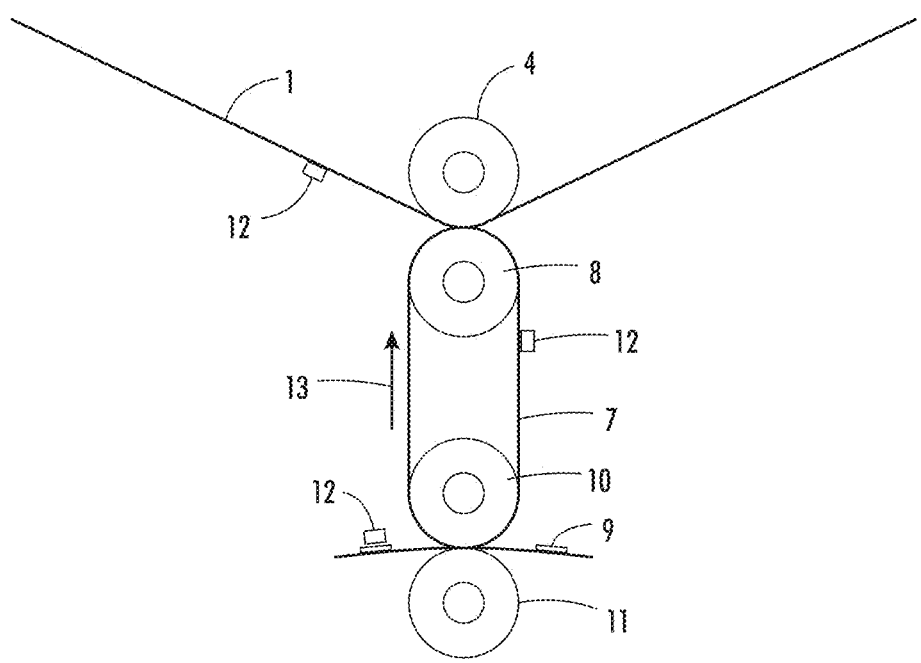
FIG. 5 depicts an exemplary fuser configuration using a transfix apparatus.

FIG. 5 demonstrates a view of an embodiment of a transfix member 7 which may be in the form of a belt, sheet, film, or like form. The transfix member 7 is constructed similarly to the fuser belt 200 described above. The developed image 12 positioned on intermediate transfer member 1 is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

A composite surface coating that improves surface properties is described. The fluoropolymers listed earlier (e.g. PFA Teflon, PTFE Teflon, FEP, VITON E®, VITON E 60C®, VITON E430®, VITON 910®, VITON ETP®, FLUOREL 2170®, FLUOREL 2174®, FLUOREL 2176®, FLUOREL 2177® and FLUOREL LVS 76®, FLUOREL® etc) exhibit excellent properties for a surface coating used as a fuser top coat.

A modified carboxy cellulose of the structure below can be dispersed in the fluoropolymer. The modified carboxy cellulose has the formula

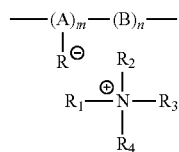

wherein:

(1) $R_1$, $R_2$, $R_3$, and $R_4$ each, independently of the others, are:

(A) —H;

(B) alkyl, including substituted and unsubstituted alkyl, wherein hetero atoms, such as oxygen, nitrogen, sulfur, silicon, phosphorus, boron, or the like either may or may not be present in alkyl, in one embodiment with at least about 8 carbons, in another embodiment with at least about 16 carbons, and in yet another embodiment with at least about 24 carbons, and in one embodiment with no more than about 48 carbons, in another embodiment with no more than about 36 carbons, and in yet another embodiment with no more than about 30 carbons;

(C) aryl, including substituted and unsubstituted aryl, wherein hetero atoms, such as oxygen, nitrogen, sulfur, silicon, phosphorus, boron, or the like either may or may not be present in aryl, in one embodiment with at least about 10 carbons, in another embodiment with at least about 16 carbons, and in yet another embodiment with at least about 24 carbons, and in one embodiment with no more than about 48 carbons, in another embodiment with no more than about 36 carbons, and in yet another embodiment with no more than about 30 carbons, such as phenyl or the like;

(D) arylalkyl, including substituted and unsubstituted arylalkyl, wherein the alkyl portion of arylalkyl can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of arylalkyl, in one embodiment with at least about 6 carbons, in another embodiment with at least about 7 carbons, and in yet another embodiment with at least about 8 carbons, and in one embodiment with no more than about 16 carbons, in another embodiment with no more than about 14 carbons, and in yet another embodiment with no more than about 10 carbons, such as benzyl or the like; or (E) alkylaryl, including substituted and unsubstituted alkylaryl, wherein the alkyl portion of alkylaryl can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of alkylaryl, in one embodiment with at least about 7 carbons, in another embodiment with at least about 9 carbons, and in yet another embodiment with at least about 11 carbons, and in one embodiment with no more than about 17 carbons, in another embodiment with no more than about 15 carbons, and in yet another embodiment with no more than about 13 carbons, such as tolyl or the like;

and wherein in one specific embodiment the total number of carbons in $R_1+R_2+R_3+R_4$ is at least about 8, in another specific embodiment at least about 24, and in yet another specific embodiment at least about 48;

(2) R is a group of the formula —COOH, —COOM, —$R_5$—COOH, —$R_5$—COOM, —X—$R_5$—COOH, or —X—$R_5$—COOM, wherein:

(A) $R_5$ is:

(i) alkylene, including substituted and unsubstituted alkylene, wherein hetero atoms, such as oxygen, nitrogen, sulfur, silicon, phosphorus, boron, or the like either may or may not be present in alkylene, in one embodiment with at least about 3 carbons, in another embodiment with at least about 4 carbons, and in yet another embodiment with at least about 6 carbons, and in one embodiment with no more than about 14 carbons, in another embodiment with no more than about 10 carbons, and in yet another embodiment with no more than about 8 carbons;

(ii) arylene, including substituted and unsubstituted arylene, wherein hetero atoms, such as oxygen, nitrogen, sulfur, silicon, phosphorus, boron, or the like either may or may not be present in arylene, in one embodiment with at least about 8 carbons, in another embodiment with at least about 9 carbons, and in yet another embodiment with at least about 10 carbons, and in one embodiment with no more than about 17 carbons, in another embodiment with no more than about 16 carbons, and in yet another embodiment with no more than about 12 carbons, such as phenylene or the like;

(iii) arylalkylene, including substituted and unsubstituted arylalkylene, wherein the alkyl portion of arylalkylene can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of arylalkylene, in one embodiment with at least about 8 carbons, in another embodiment with at least about 11 carbons, and in yet another embodiment with at least about 12 carbons, and in one embodiment with no more than about 20 carbons, in another embodiment with no more than about 17 carbons, and in yet another embodiment with no more than about 13 carbons, such as benzylene or the like; or (iv) alkylarylene, including substituted and unsubstituted alkylarylene, wherein the alkyl portion of alkylarylene can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of alkylarylene, in one embodiment with at least about 8 carbons, in another embodiment with at least about 11 carbons, and in yet another embodiment with at least about 12 carbons, and in one embodiment with no more than about 20 carbons, in another embodiment with no more than about 17 carbons, and in yet another embodiment with no more than about 13 carbons, such as tolylene or the like;

(B) M is a cationic metal, including alkali metal cations, such as $Li^+$, $Na^+$, $K^+$, $Rb^+$, and $Cs^+$, alkaline earth metal cations, such as $Mg^{2+}$, $Ca^{2+}$, $Sr^{2+}$, and $Ba^{2+}$, $Al^{3+}$ transition metal cations, such as $Ag^+$, $Zn^{2+}$, $Cr^{2+}$, $Cr^{3+}$, $Mn^{2+}$, $Mn^{3+}$, $Ni^{2+}$, $Ni^{3+}$, $Fe^{2+}$, $Fe^{3+}$, $Co^{2+}$, $Co^{3+}$, $Cu^+$, $Cu^{2+}$, $Hg^+$, $Hg^{2+}$, $Sn^{2+}$, $Sn^{4+}$, $Pb^{2+}$, $Pb^{4+}$, $Sc^{3+}$, or the like, as well as mixtures thereof, it being understood that when the oxidation state of the metal is higher than one, the number of R groups associated with the metal is equal to the oxidation state of the metal;

wherein in one specific embodiment the cationic metal is $Na^+$, $K^+$, $Mg^{2+}$, $Ca^{2+}$, $Fe^{2+}$, $Fe^{3+}$, $Zn^{2+}$, or a mixture thereof, and in another specific embodiment the cationic metal is $Li^+$, $Na^+$, $K^+$, $Rb^+$, $Cs^+$, or a mixture thereof;

(C) X is:
(i) —O—;
(ii) —S—;
(iii) a group of the formula —$NR_6R_7$—; wherein $R_6$ and $R_7$ each, independently of the other are:
(a) —H;
(b) alkyl, including substituted and unsubstituted alkyl, wherein hetero atoms, such as oxygen, nitrogen, sulfur, silicon, phosphorus, boron, or the like either may or may not be present in alkyl, in one embodiment with at least about 1 carbon, and in one embodiment with no more than about 5 carbons;
(c) aryl, including substituted and unsubstituted aryl, wherein hetero atoms, such as oxygen, nitrogen, sulfur, silicon, phosphorus, boron, or the like either may or may not be present in aryl, in one embodiment with at least about 6 carbons, and in one embodiment with no more than about 10 carbons, such as phenyl or the like;

(d) arylalkyl, including substituted and unsubstituted arylalkyl, wherein the alkyl portion of arylalkyl can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of arylalkyl, in one embodiment with at least about 7 carbons, and in one embodiment with no more than about 14 carbons, such as benzyl or the like; or (e) alkylaryl, including substituted and unsubstituted alkylaryl, wherein the alkyl portion of alkylaryl can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of alkylaryl, in one embodiment with at least about 7 carbons, and in one embodiment with no more than about 14 carbons, such as tolyl or the like;

(iv) a group of the formula

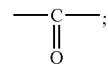

(v) a group of the formula

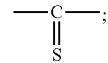

or
(vi) a group of the formula

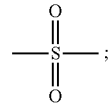

(3) A represents a saccharide monomer repeating unit having one or more R groups;

(4) B represents a saccharide monomer repeating unit having no R groups;

(5) m is an integer representing the number of repeating A units, in one embodiment at least about 5, in another embodiment at least about 10, and in yet another embodiment at least about 15, and in one embodiment no more than about 35, in another embodiment no more than about 25, and in yet another embodiment no more than about 20; and (6) n is an integer representing the number of repeating B units, in one embodiment at least about 45, in another embodiment at least about 90, and in yet another embodiment at least about 135, and in one embodiment no more than about 315, in another embodiment no more than about 225, and in yet another embodiment no more than about 180;

wherein the substituents on the substituted alkyl, alkylene, aryl, arylene, arylalkyl, arylalkylene, alkylaryl, and arylalkylene groups can be hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, silyl groups, siloxyl groups, silane groups, mixtures thereof, or the like, wherein two or more substituents can be joined together to form a ring.

Examples of suitable A groups include:

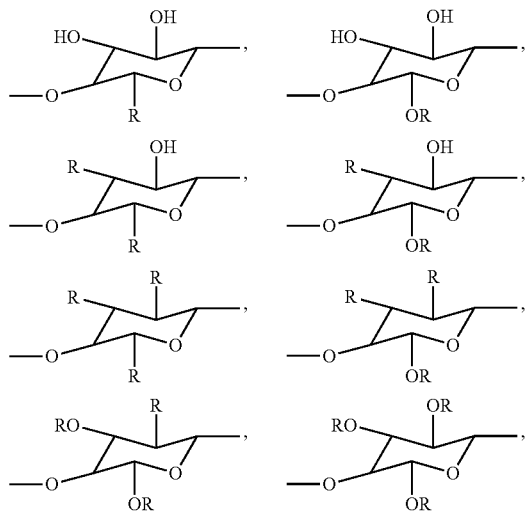

or the like, as well as mixtures thereof, wherein each R, independently of the others, is as defined above. The drawings are not necessarily intended to represent stereochemistry with respect to positions of the substituents on the ring. Additional examples include materials such as modified alginates, carrageenan, chitin, ficoll, fructans, galactans, glucans, glycosaminoglycans, mannans, oligosaccharides, pectins, pentosan, sulfuric polyester, plant gums, polysaccharides (bacterial), proteoglycans, sepharose, xylans, or the like, as well as mixtures thereof.

Examples of suitable B groups include:

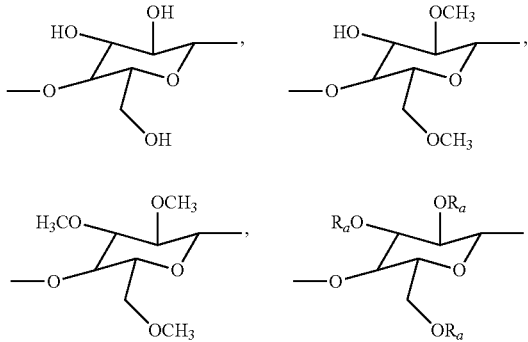

wherein each $R_a$, independently of the others, is hydrogen or methyl, provided that at least one $R_a$ is methyl,

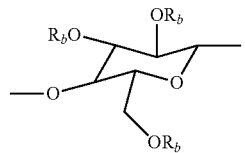

wherein each $R_b$, independently of the others, is hydrogen or ethyl, provided that at least one $R_b$ is ethyl,

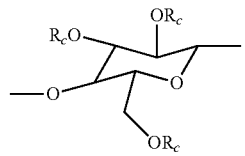

wherein each $R_c$, independently of the others, is hydrogen, methyl, or ethyl, provided that at least one $R_c$ is ethyl and one $R_c$ is methyl,

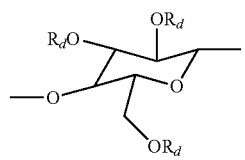

wherein each $R_d$, independently of the others, is hydrogen or hydroxyethyl, provided that at least one $R_d$ is hydroxyethyl,

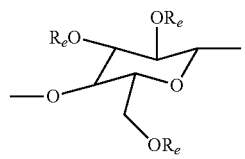

wherein each $R_e$, independently of the others, is hydrogen or hydroxypropyl, provided that at least one $R_e$ is hydroxypropyl,

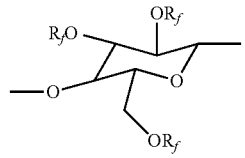

wherein each $R_f$, independently of the others, is hydrogen, methyl, or hydroxypropyl, provided that at least one $R_f$ is methyl and one $R_f$ is hydroxypropyl,

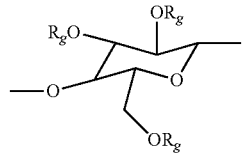

wherein each $R_g$, independently of the others, is hydrogen, ethyl, or hydroxyethyl, provided that at least one $R_g$ is ethyl and one $R_g$ is hydroxyethyl, or the like, as well as mixtures thereof. The drawings are not necessarily intended to represent stereochemistry with respect to positions of the substituents on the ring. Additional examples include materials such as alginates, carrageenan, chitin, ficoll, fructans, galactans, glucans, glycosaminoglycans, mannans, oligosaccharides, pectins, pentosan, sulfuric polyester, plant gums, polysaccharides (bacterial), proteoglycans, sepharose, xylans, or the like, as well as mixtures thereof.

Some specific examples of suitable quaternary ammonium

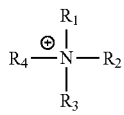

counterions include

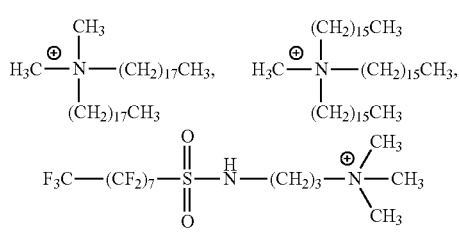

or the like, as well as mixtures thereof.

Specific examples of alkylated quaternary ammonium counterions include N,N,N-trimethyl-3-(perfluorooctylsulfonamido)propan-1-aminium (CAS No 1652-63-7) can be obtained from American Custom Chemicals Corporation; tetraoctylammonium, tetradodecylammonium, tetraoctadecylammonium, cetyltrimethylammonium, N,N-dimethyl dioctadecylammonium, N,N-dimethyl dioctylammonium, N,N-dimethyl dodecylammonium, N,N,N-trimethyl-1-docosanammonium, behenyl trimethylammonium, N-octadecyltrimethylammonium, 1-hexadecaneammonium, N,N-dihexadecyl-N-methyl-1-hexadecaneammonium, mixtures thereof, and salts thereof. Other suitable ammonium cations can be obtained from materials such as ARQUAD® materials available from AKZO NOBEL, such as ARQUAD® 316, cocotrimonium ARQUAD® PC C-35, didecyldimethylammonium from ARQUAD® 2.10-50, ARQUAD® 2.10-70 HFP, 2.10-80, coco(fractionated) dimethylbenzylammonium from ARQUAD® MCB 33, ARQUAD® MCB 50, ARQUAD® MCB 80, hexadecyltrimethylammonium from ARQUAD® 16-29, stearyltrimethylammonium from ARQUAD® 18-50, behenyltrimethylammonium from ARQUAD® 20-80, mixtures thereof, and salts thereof.

Specific examples of suitable alkoxylated quaternary ammonium counterions include materials obtained from ETHOQUAD® C/12 cocoyl-bis-(2-hydroxyethyl)methylammonium chloride, ETHOQUAD® C/25 polyoxyethylene (15)cocoalkylmethylammonium chloride, and ETHOQUAD® O/12 (oleylbis(2-hydroxyethyl)methylammonium chloride), available from Lion Akzo Corporation.

In additional embodiments, the quaternary ammonium counterion can be an oligomer of the formula

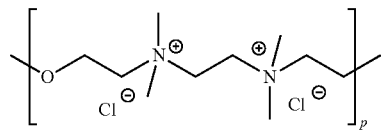

(shown with the anion with which it is commercially obtained) wherein p is at least 1. In a specific embodiment, the quaternary ammonium counter ion is poly[oxy-1,2-ethanediyl(dimethyliminio)-1,2-ethanediyl(dimethyliminio)-1,2-ethanediylchloride (1:2)] (polixetonium chloride), available from Advantis Technologies, Inc.

In still other embodiments, the quaternary ammonium counterion is benzyltributylammonium bromide, benzyltributylammonium chloride, benzyltriethylammonium chloride, benzyltriethylammonium bromide, benzyltriethylammonium iodide, benzyltrimethylammonium iodide, benzyltrimethylammonium bromide, benzyltrimethylammonium chloride, or mixtures thereof (neat or in solution).

In some specific embodiments, the counterion comprises a nitrogen-aryl counterion. In other embodiments, the counterion comprises a nitrogen-arylalkyl counter ion.

The quaternary ammonium counterion can be an esterquat of the formula

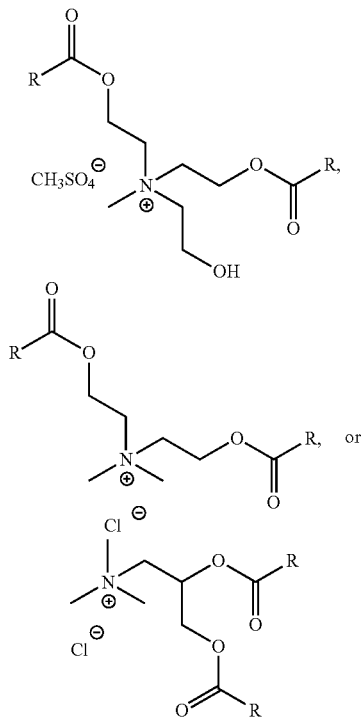

(shown with the anions with which they are commercially obtained) wherein each R, independently of the others, is n-heptyl, n-nonyl, n-undecyl, n-tridecyl, n-pentadecyl, n-heptadecyl, n-nonadecyl, n-heneicosyl, or mixtures thereof. Examples of esterquat-based counterions include those available from Kao Chemicals Inc., quaternary ammonium salts of: reacted fatty acids, C10-C20 and unsaturated C16-C18, with triethanolamine (CAS No. 91995-81-2), reacted tallow fatty acids with triethanolamine (CAS No. 93334-15-7), reacted fatty acids, C12-C20 with triethanolamine (CAS No. 91032-11-0), reacted 9-octadecenoic acid (Z)

with triethanolamine (CAS No. 94095-35-9), and reacted octadecenoic acid with triethanolamine (CAS No. 85408-12-4). Other examples of esterquats include dimethylbis[2-[(1-oxooctadecyl)oxy]ethyl]ammonium chloride (CAS No. 67846-68-8), dimethylbis[2-[(1-oxohexadecyl)oxy]ethyl] ammonium chloride (97158-31-1), and (Z)-2-hydroxy-3-[(1-oxo-9-octadecenyl)oxy]propyltrimethylammonium chloride (CAS No. 19467-38-0).

The modified cellulose compounds disclosed herein can have weight average molecular weights (measured in Daltons) of in one embodiment at least about 10,000, in another embodiment at least about 20,000, and in yet another embodiment at least about 50,000, and in one embodiment no more than about 150,000, in another embodiment no more than about 100,000, and in yet another embodiment no more than about 75,000.

The compounds disclosed herein can have number average molecular weights (measured in Daltons) of in one embodiment at least about 4,000, in another embodiment at least about 8,000, and in yet another embodiment at least about 20,000, and in one embodiment no more than about 60,000, in another embodiment no more than about 40,000, and in yet another embodiment no more than about 30,000.

The compounds disclosed herein can be prepared by reacting the polysaccharide of the formula

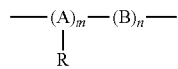

with the quaternary ammonium salt of the formula

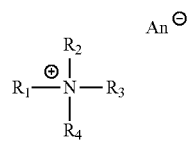

wherein An is the anion originally associated with the quaternary ammonium salt, such as $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_3^-$, $NO_3^-$, $HCOO^-$, $CH_3COO^-$, $H_2PO_4^-$, $HPO_4^{2-}$, $SCN^-$, $BF_4^-$, $ClO_4^-$, $SSO_3^-$, $PF_6^-$, $SbCl_6^-$, or the like, as well as mixtures thereof, on an approximately equimolar basis in water at temperatures of from about 50 to about 80° C. for from about 30 to about 180 minutes.

A suitable example polysaccharide for modification with at least one quaternary ammonium include sodium carboxymethylcellulose. Degrees of substitution of sodium in sodium carboxymethylcellulose typically range from about 0.6 to about 1.5 such that the sodium content ranges from about 7 to about 12 percent by weight. Sodium carboxymethylcellulose is a versatile substance and functions as a suspending aid, binder, thickener and film former in a variety of applications such as in the food, pharmaceutical, cosmetic, paper coatings, oral care, and paint industries.

Fluoropolymers are commonly processed from powders and then brought to melting or curing temperature (200° C.-400° C.) to form a coherent coating. When the modified cellulose described herein and fluoropolymer particles are combined and brought to melting or curing temperature, a fused fluororesin matrix is produced with embedded modified cellulose. Possible methods of processing modified composite coatings include powder coating, spray coating from solvent dispersion, and sleeve coating. The layer incorporates modified cellulose dispersed throughout a fluoropolymer matrix at a loading of from about 0.1 weight percent to about 25 weight percent, or from about 0.5 weight percent to about 20 weight percent or from about 1 weight percent to about 5 weight percent.

The surface coating may contain other filler materials in addition to the modified cellulose described in more detail below. Suitable additional fillers include glass flake, glass bead, glass fiber, aluminum or zirconium silicate, mica, metal flake, metal fiber, fine ceramic powders, silicon dioxide, barium sulfate, talc, etc. The surface coating may also contain pigment, the amount of which will depend on the color desired and the particular pigment being used.

The composition of fluoropolymer and modified celluose is coated on a substrate to form a surface layer in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like. The solvent used to disperse the fluoropolymer particles and the modified cellulose is a non-polar solvent. Such non-polar solvent include of alcohols, ketones, methyl ethyl ketone (MEK) and methyl isobutylketone (MIBK).

Specific embodiments will now be described in detail. These examples are intended to be illustrative, and not limited to the materials, conditions, or process parameters set forth in these embodiments. All parts are percentages by solid weight unless otherwise indicated.

EXAMPLES

Example 1

Using Modified Sodium Carboxymethyl Cellulose as a Filler Material for Anti-adhesion Coatings Commercially available sodium carboxymethyl cellulose and N,N-dimethyldioctadecyl bromide were obtained from Aldrich. Arquad 316 was obtained from Akzo Nobel. A 500 mL beaker fitted with a heating bath was prepared. The beaker included a magnetic stirrer. 250 mL of deionized water and 6.6 g sodium carboxymethyl cellulose containing 0.02 mol sodium were added to the beaker. The temperature of the beaker was raised to 80° C. and the mixture was stirred until the cellulose completely dissolved. 0.02 mol of quaternary ammonium salt (Arquad 316) was added to the clear solution and the mixture was allowed to react for an hour. The white solid was isolated through filtration using a glass frit and allowed to air dry for 24 hours. The material, identified as modified carboxymethyl cellulose was analyzed by thermal gravimetric analysis (TGA) and shown to be stable to a temperature of about 200° C.

Figure 6:
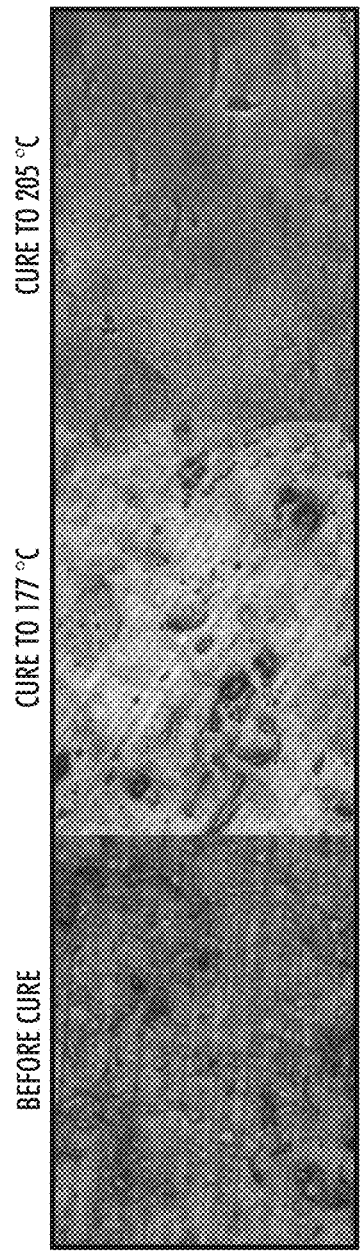
FIG. 6 shows modified carboxymethyl cellulose dispersed in a fluoropolymer coating.

The modified carboxymethyl cellulose described above was de-agglomerated and dispersed in solvent by milling with milling media (stainless steel, ceramic, or other) to yield a stable, milky dispersion. Solvents used for dispersion included ketones, alcohols, acetonitrile or other. Modified carboxymethyl cellulose was loaded into a solvent in a ratio of between about 5 weight percent to about 30 weight percent. The modified cellulose dispersion was combined with a fluoropolymer solution (such as FKM polymer (vinylidene fluoride (VDF) and hexafluoropropylene (HFP)) dissolved in ketone with a solids loading of 15-20%) to yield a total percent incorporation of modified cellulose in FKM polymer of about weight percent to about 20 weight percent. Following mixing, modified cellulose/fluoropolymer dispersions were coated onto a surface via an appropriate coating method and cured in a stepwise sequence to 205° C. over 22 hours. Modified cellulose was observed to be well-dispersed in fluoropolymer prior to cure (FIG. 6). Following heat treatment to 177° C. and then to 205° C., modified cellulose remains dispersed and without decomposition. Compatibility of this modified cellulose formulation with fluorinated coating materials is indicated and presents a viable way to introduce high strength, renewable content into anti-adhesion coatings.

Example 2

Commercially available sodium carboxymethyl cellulose is obtained from Sigma-Aldrich Corporation. N,N,N-trimethyl-3-(perfluorooctylsulfonamido)propan-1-aminium iodide is obtained from American Custom Chemicals Corporation. A 500 milliliter beaker fitted with a heating bath is prepared. The beaker includes a magnetic stirrer. To the beaker is added 250 milliliters of deionized water and 6.6 grams sodium carboxymethyl cellulose containing 0.02 mol sodium. The temperature of the beaker is raised to 80° C. and the mixture is stirred until the cellulose is completely dissolved. To the resultant clear solution in the beaker is added 0.02 mol of quaternary ammonium salt (N,N,N-trimethyl-3-(perfluorooctylsulfonamido)propan-1-aminium iodide) and the mixture is allowed to react for an hour. The white solid is isolated through filtration using a glass frit and allowed to air dry for 24 hours with the reacted product predominantly comprised of the structure:

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:

1. A surface layer comprising (a) a fluoropolymer and (b) a modified cellulose of the formula

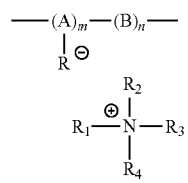

wherein the structure:

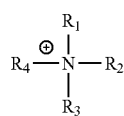

is represented by:

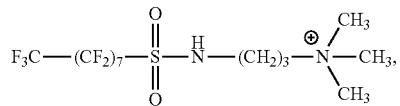

R is a group of the formula —COOH, —COOM, —$R_5$—COOH, —$R_5$—COOM, —X—$R_5$—COOH, or —X—$R_5$—COOM, wherein:
(A) $R_5$ is a first moiety selected from the group consisting of alkylene, arylene, arylalkylene, and alkylarylene, including substituted and unsubstituted first moieties, wherein hetero atoms either may or may not be present in the first moiety;
(B) M is a cationic metal;
(C) X is:
(i) —O—;
(ii) —S—;
(iii) a group of the formula —N$R_6R_7$—; wherein $R_6$ and $R_7$ each, independently of the other are:
(a) —H; or
(b) a second moiety selected from the group consisting of alkyl, aryl, arylalkyl, and alkylaryl, including substituted and unsubstituted second moieties, wherein hetero atoms either may or may not be present in the second moiety;
(iv) a group of the formula

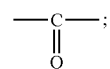

(v) a group of the formula

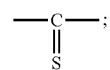

or (vi) a group of the formula

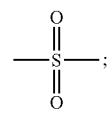

A represents a saccharide monomer repeating unit having one or more R groups;
B represents a saccharide monomer repeating unit having no R groups;
m is an integer representing the number of repeating A units; and
n is an integer representing the number of repeating B units;
wherein modified cellulose comprises from about 0.1 weight percent to about 25 weight percent of the surface layer.

2. The surface layer of claim 1, wherein the modified cellulose comprises from about 1 to about 5 weight percent of the surface layer.

3. The surface layer of claim 1, wherein the fluoropolymer comprises a fluoroelastomer selected from the group consisting of a) copolymers of two of vinylidenefluoride, hexafluoropropylene, and tetrafluoroethylene; b) terpolymers of vinylidenefluoride, hexafluoropropylene, and tetrafluoroethylene; and c) tetrapolymers of vinylidenefluoride, hexafluoropropylene, tetrafluoroethylene, and a cure site monomer.

4. The surface layer of claim 1, wherein the fluoropolymer comprises a fluoroplastic selected from the group consisting of polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), hexafluoropropylene (HFP) and a cure site monomer.

5. The surface layer of claim 1, wherein the surface layer further comprises fillers selected from the group consisting of glass flake, glass bead, glass fiber, aluminum silicate, zirconium silicate, mica, metal flake, metal fiber, fine ceramic powders, silicon dioxide, barium sulfate, talc and pigment.

6. A fuser member comprising:
a substrate;
a functional layer disposed on the substrate; and
a surface layer according to claim 1 disposed on the functional layer.

7. The fuser member of claim 6 wherein the surface layer comprises a thickness of about 10 microns to about 100 microns.

8. A surface coating comprising a fluoropolymer having dispersed therein a compound of the formula:

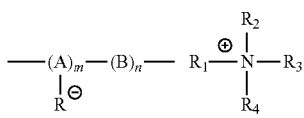

wherein the structure

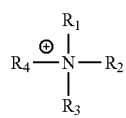

is represented by:

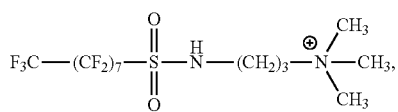

R is a group of the formula —COOH, —COOM, —R$_5$—COOH, —R$_5$—COOM, —X—R$_5$—COOH, or —X—R$_5$—COOM wherein R$_5$ is a first substituent selected from the group consisting of alkylene, arylene, arylalkene, alkyl aryl, X is:
(i) —O—;
(ii) —S—;
(iii) a group of the formula —NR$_6$R$_7$—; wherein R$_6$ and R$_7$ each, independently of the other are —H; a second substitutent selected from the group consisting of alkyl, aryl, arylalkyl, alkylaryl, including substituted and unsubstituted second substituent, wherein hetero atoms either may or may not be present in second susbstituent;

(iv) a group of the formula

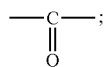

(v) a group of the formula

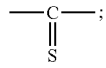

or (vi) a group of the formula

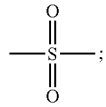

M is a cationic metal, A represents a saccharide monomer repeating unit having one or more R groups, B represents a saccharide monomer repeating unit having no R groups, m is an integer representing the number of repeating A units, and n is an integer representing the number of repeating B units.

9. The surface coating of claim 8, wherein the compound comprises from about 0.1 weight percent to about 25 weight percent of the surface coating.

10. The surface coating of claim 8, wherein the fluoropolymer comprises a fluoroelastomer selected from the group consisting of a) copolymers of two of vinylidenefluoride, hexafluoropropylene, and tetrafluoroethylene; b) terpolymers of vinylidenefluoride, hexafluoropropylene, and tetrafluoroethylene; and c) tetrapolymers of vinylidenefluoride, hexafluoropropylene, tetrafluoroethylene, and a cure site monomer.

11. The surface coating of claim 8, wherein the fluoropolymer comprises a fluoroplastic selected from the group consisting of polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), hexafluoropropylene (HFP) and a cure site monomer.

12. The surface coating of claim 8, wherein the surface coating further comprises fillers selected from the group consisting of glass flake, glass bead, glass fiber, aluminum silicate, zirconium silicate, mica, metal flake, metal fiber, fine ceramic powders, silicon dioxide, barium sulfate, talc and pigment.

13. A fuser member comprising:
a substrate;
a functional layer disposed on the substrate; and
an outer layer disposed on the functional layer wherein the outer layer comprises a fluoropolymer having dispersed therein a compound of the formula:

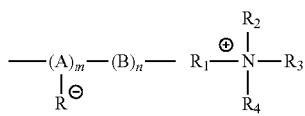

wherein the structure:

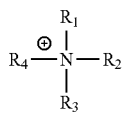

is represented by:

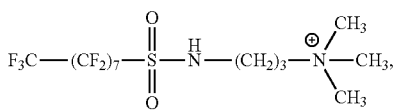

R is a group of the formula —COOH, —COOM, —$R_5$—COOH, —$R_5$—COOM, —X—$R_5$—COOH, or —X—$R_5$—COOM wherein $R_5$ is a first substituent selected from the group consisting of alkylene, arylene, arylalkene, alkyl aryl, X is:
(i) —O—;
(ii) —S—;
(iii) a group of the formula —$NR_6R_7$—; wherein $R_6$ and $R_7$ each, independently of the other are —H; a second substitutent selected from the group consisting of alkyl, aryl, arylalkyl, alkylaryl, including substituted and unsubstituted second substituent, wherein hetero atoms either may or may not be present in second susbstituent;
(iv) a group of the formula

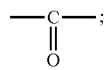

(v) a group of the formula

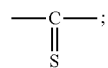

or (vi) a group of the formula

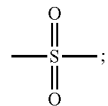

M is a cationic metal, A represents a saccharide monomer repeating unit having one or more R groups, B represents a saccharide monomer repeating unit having no R groups, m is an integer representing the number of repeating A units, and n is an integer representing the number of repeating B units, wherein the compound comprises from about 0.1 weight percent to about 25 weight percent of the outer layer.

14. The fuser member of claim 13, wherein the compound comprises from about 1 weight percent to about 5 weight percent of the outer layer.

15. The fuser member of claim 13 wherein the outer layer comprises a thickness of about 10 microns to about 100 microns.

16. The fuser member of claim 13, wherein the outer layer further comprises filler materials selected from the group consisting carbon black, graphite, fullerene, acetylene black, fluorinated carbon black, carbon nanotubes, metal oxides, doped metal oxides, polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixture thereof.

17. The fuser member of claim 13, wherein the functional layer comprises a silicone material.

* * * * *